(12) United States Patent
Yoo et al.

(10) Patent No.: US 12,444,124 B2
(45) Date of Patent: Oct. 14, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Jisung Yoo, Suwon-si (KR); Youngjin Park, Suwon-si (KR); Daehyun Kim, Suwon-si (KR); Boseok Moon, Suwon-si (KR); Yongkoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 18/208,976

(22) Filed: Jun. 13, 2023

(65) Prior Publication Data

US 2023/0326120 A1    Oct. 12, 2023

Related U.S. Application Data

(63) Continuation of application No. PCT/KR2022/016711, filed on Oct. 28, 2022.

(30) Foreign Application Priority Data

Oct. 29, 2021    (KR) .................. 10-2021-0146357

(51) Int. Cl.
*G06T 17/00*    (2006.01)
*G06T 7/11*    (2017.01)
(Continued)

(52) U.S. Cl.
CPC ............... *G06T 15/04* (2013.01); *G06T 7/11* (2017.01); *G06T 17/00* (2013.01); *G06V 10/22* (2022.01);
(Continued)

(58) Field of Classification Search
None
See application file for complete search history.

(56) References Cited

U.S. PATENT DOCUMENTS 7,856,125 B2    12/2010    Medioni et al.
10,085,005 B2    9/2018    Pitts et al.
(Continued)

FOREIGN PATENT DOCUMENTS

CN    112541963 A    3/2021
JP    2020-149174 A    9/2020
(Continued)

OTHER PUBLICATIONS

Carroll et al. "3D Rendering in the Cloud", 2012. (Year: 2012).*
(Continued)

*Primary Examiner* — Nicholas R Wilson
(74) *Attorney, Agent, or Firm* — Sughrue Mion, PLLC

(57) ABSTRACT

Provide is an electronic apparatus that includes a communication interface, a memory storing at least one instruction, and a processor configured to execute the at least one instruction to: obtain an image including a person object, obtain a 3D shape model corresponding to the person object included in the image, map a texture of the image to the 3D shape model based on identification information for each
(Continued)

area of the 3D shape model, and generate a 3D avatar corresponding to the person object based on the 3D shape model to which the texture of the image is mapped.

17 Claims, 11 Drawing Sheets

(51) Int. Cl.
    *G06T 15/04*      (2011.01)
    *G06V 10/22*      (2022.01)
    *G06V 10/82*      (2022.01)
    *G06V 40/10*      (2022.01)

(52) U.S. Cl.
    CPC .............. *G06V 10/82* (2022.01); *G06V 40/10* (2022.01); *G06T 2207/20084* (2013.01); *G06T 2207/30196* (2013.01)

(56) References Cited

U.S. PATENT DOCUMENTS

| | | | |
|---|---|---|---|
| 10,535,163 | B2 | 1/2020 | Li et al. |
| 10,893,250 | B2 | 1/2021 | Kar et al. |
| 11,587,300 | B2 | 2/2023 | Peng et al. |
| 2017/0353711 | A1 | 12/2017 | Wayenberg |
| 2019/0122411 | A1* | 4/2019 | Sachs ........................ G06T 7/90 |
| 2020/0372710 | A1 | 11/2020 | Wang et al. |
| 2020/0380780 | A1 | 12/2020 | Lysenkov |
| 2021/0005003 | A1 | 1/2021 | Chong et al. |
| 2021/0209835 | A1* | 7/2021 | Fonseka .................. G06T 17/20 |
| 2021/0407216 | A1 | 12/2021 | Peng et al. |
| 2022/0068007 | A1* | 3/2022 | Lafer ........................ G06T 7/50 |
| 2022/0180597 | A1 | 6/2022 | Miyamoto |
| 2023/0028240 | A1 | 1/2023 | Choi et al. |

FOREIGN PATENT DOCUMENTS

| | | |
|---|---|---|
| KR | 10-0327541 B1 | 3/2002 |
| KR | 10-1072944 B1 | 10/2011 |
| KR | 10-2018-0068485 A | 6/2018 |
| KR | 10-2019-0112428 A | 10/2019 |
| KR | 10-2179584 B1 | 11/2020 |
| KR | 10-2021-0026521 A | 3/2021 |
| KR | 10-2241153 B1 | 4/2021 |
| KR | 10-2245220 B1 | 4/2021 |
| WO | 02/13144 A1 | 2/2002 |

OTHER PUBLICATIONS

MercèÁlvarez De La Campa Crespo, "3D virtual body from a single image", Master in Innovation and Research in Informatics Facultat d'Informatica de Barcelona, Universitat Politecnica de Catalunya, Apr. 2020, pp. 1-36 (total 38 pages), URL: https://upcommons.upc.edu/handle/2117/192221.
International Search Report (PCT/ISA/210) issued by the International Searching Authority on Feb. 15, 2023 in International Patent Application No. PCT/KR2022/016711.
Written Opinion (PCT/ISA/237) issued by the International Searching Authority on Feb. 15, 2023 in International Patent Application No. PCT/KR2022/016711.
Li, Zhong et al., "Animated 3D human avatars from a single image with GAN-based texture inference", Computers & Graphics, vol. 95, Apr. 2021, pp. 81-91, https://doi.org/10.1016/j.cag.2021.01.002.
Communication issued Sep. 9, 2024 by the European Patent Office in European Patent Application No. 22887703.1.

* cited by examiner

ELECTRONIC APPARATUS AND METHOD FOR CONTROLLING THEREOF

CROSS-REFERENCE TO RELATED APPLICATIONS

This application is a bypass continuation of PCT International Application No. PCT/KR2022/016711, which was filed on Oct. 28, 2022, and claims priority to Korean Patent Application No. 10-2021-0146357 filed on Oct. 29, 2021 in the Korean Intellectual Property Office, the disclosures of which are incorporated herein by reference in their entireties.

BACKGROUND

1. Field

The disclosure relates to an electronic apparatus and a controlling method thereof and more particularly, to an electronic apparatus for obtaining a three-dimensional (3D) avatar corresponding to a person object included in an image, and a controlling method thereof.

2. Description of the Related Art

Unlike a rule-based smart system, an artificial intelligence (AI) system is a system in which a machine learns, judges and becomes smart by itself. As the artificial intelligence system is used, the recognition rate is improved and users' preference can be understood more accurately and therefore, rule-based smart systems are gradually being replaced with deep learning-based artificial intelligence systems.

Artificial intelligence technology is composed of machine learning (deep learning) and elementary technologies which utilizes machine learning. Machine learning is an algorithm technology that is capable of classifying or learning characteristics of input data. Elementary technologies include technology that simulates functions such as recognition and judgment of a human brain using machine learning algorithms such as deep learning. Machine learning is composed of technical fields such as linguistic understanding, visual understanding, reasoning, prediction, knowledge representation, motion control, or the like. In particular, the language understanding is a technology of recognizing and applying human language/culture, including natural language processing, machine translation, dialogue system, query response, voice recognition/synthesis, and the like.

Additionally, research on a technology for generating a 3D avatar corresponding to a person using an artificial intelligence model is being actively conducted. A related art avatar generating system captures a user's face photo, generates a 3D face model, and generates a 3D avatar by using an existing template model for the rest of the parts except for the face. Therefore, there is a problem that the generated 3D avatar does not resemble the appearance of the actual user. In addition, to generate a 3D avatar, the related art system requires a plurality of images capturing the user from various angles, and requires the user to perform a rigging operation manually.

Accordingly, there is a need for a technology capable of generating a 3D avatar resembling the user's actual appearance with only one image capturing the user without any additional rigging operation by the user.

SUMMARY

Provided are systems and methods for generating a 3D avatar resembling a user's actual appearance using one photographic image of the user.

The technical problems of the present disclosure are not limited to the technical problems above, and other technical problems not mentioned will be clearly understood by those skilled in the art based on the following descriptions.

According to an aspect of the disclosure, an electronic apparatus includes a communication interface including communication circuitry; a memory storing at least one instruction; and a processor configured to execute the at least one instruction to: obtain an image including a person object; obtain a three-dimensional (3D) shape model corresponding to the person object included in the image; map a texture of the image to the 3D shape model based on identification information for each area of the 3D shape model; and generate a 3D avatar corresponding to the person object based on the 3D shape model to which the texture of the image is mapped.

The processor may be further configured to: obtain a first 3D shape model by mapping the texture of the image to a first area of the 3D shape model; and obtain a second 3D shape model by mapping the texture of the image to a second area of the 3D shape model based on the identification information.

The processor may be further configured to: obtain identification information for each area of the 3D shape model by performing image segmentation with respect to the first 3D shape model.

The processor may be further configured to: obtain information regarding an area in which the person object is present in the image by inputting the image to a first neural network model trained to identify an area corresponding to a predetermined object; obtain posture information of the person object by inputting the image to a second neural network model trained to estimate a posture of an object; and obtain information regarding the 3D shape model by inputting the information regarding an area in which the person object is present in the image and the posture information of the person object to a third neural network model trained to generate a 3D shape model.

The processor may be further configured to: obtain information regarding a texture to be mapped to the 3D shape model by inputting the image, the information regarding the 3D shape model and the identification information to a fourth neural network model trained to obtain information regarding a texture corresponding to a 3D shape model and map the texture to the 3D shape model based on the obtained information regarding the texture.

The processor may be further configured to: obtain joint information corresponding to the person object by inputting the information regarding the 3D shape model and the posture information of the person object to a fifth neural network model trained to obtain joint information; and generate the 3D avatar based on the 3D shape model to which the texture of the image is mapped and the joint information.

The processor may be further configured to: obtain a photographic image capturing a face of the person object; obtain a 3D face model of the person object by inputting the photographic image to a sixth neural network model trained to reconstruct a face; and synthesize the 3D shape model and the 3D face model.

The processor may be further configured to: based on a quality of the 3D avatar being equal to or greater than a predetermined quality, control the communication interface to transmit information regarding the 3D avatar to an external apparatus.

According to an aspect of the disclosure, a method of controlling an electronic apparatus, for obtaining a three-dimensional (3D) avatar corresponding to a person object included in an image, includes: obtaining an image including a person object; obtaining a 3D shape model corresponding to the person object included in the image; mapping a texture of the image to the 3D shape model based on identification information for each area of the 3D shape model; and generating a 3D avatar corresponding to the person object based on the 3D shape model to which the texture of the image is mapped.

The mapping a texture of the image to the 3D shape model includes: obtaining a first 3D shape model by mapping the texture of the image to a first area of the 3D shape model; and obtaining a second 3D shape model by mapping the texture of the image to a second area of the 3D shape model based on the identification information.

The method includes obtaining identified information for each area of the 3D shape model by performing image segmentation with respect to the first 3D shape model.

The obtaining the 3D shape model includes: obtaining information regarding an area in which the person object is present in the image by inputting the image to a first neural network model trained to identify an area corresponding to a predetermined object; obtaining posture information of the person object by inputting the image to a second neural network model trained to estimate a posture of an object; and obtaining information regarding the 3D shape model by inputting the information regarding an area in which the person object is present in the image and the posture information of the person object to a third neural network model trained to generate a 3D shape model.

The mapping a texture of the image to the 3D shape model includes: obtaining information regarding a texture to be mapped to the 3D shape model by inputting the image, the information regarding the 3D shape model and the identification information to a fourth neural network model trained to obtain information regarding a texture corresponding to a 3D shape model; and mapping the texture to the 3D shape model based on the obtained information regarding the texture.

The method includes: obtaining joint information corresponding to the person object by inputting the information regarding the 3D shape model and the posture information of the person object to a fifth neural network model trained to obtain joint information, where the generating a 3D avatar includes generating the 3D avatar based on the 3D shape model to which the texture of the image is mapped and the joint information.

The method includes: obtaining a photographic image capturing a face of the person object; and obtaining a 3D face model of the person object by inputting the photographic image to a sixth neural network model trained to reconstruct a face, where the obtaining the 3D shape model includes synthesizing the 3D shape model and the 3D face model.

According to an aspect of the disclosure, a non-transitory computer readable medium may store computer readable program code or instructions for carrying out operations, when executed by a processor, for obtaining a three-dimensional (3D) avatar corresponding to a person object included in an image. The operations include: obtaining an image including a person object; obtaining a 3D shape model corresponding to the person object included in the image; mapping a texture of the image to the 3D shape model based on identification information for each area of the 3D shape model; and generating a 3D avatar corresponding to the person object based on the 3D shape model to which the texture of the image is mapped.

The operation of mapping a texture of the image to the 3D shape model includes: obtaining a first 3D shape model by mapping the texture of the image to a first area of the 3D shape model; and obtaining a second 3D shape model by mapping the texture of the image to a second area of the 3D shape model based on the identification information.

The operation of obtaining the 3D shape model includes: obtaining information regarding an area in which the person object is present in the image by inputting the image to a first neural network model trained to identify an area corresponding to a predetermined object; obtaining posture information of the person object by inputting the image to a second neural network model trained to estimate a posture of an object; and obtaining information regarding the 3D shape model by inputting the information regarding an area in which the person object is present in the image and the posture information of the person object to a third neural network model trained to generate a 3D shape model.

The operation of mapping a texture of the image to the 3D shape model includes: obtaining information regarding a texture to be mapped to the 3D shape model by inputting the image, the information regarding the 3D shape model and the identification information to a fourth neural network model trained to obtain information regarding a texture corresponding to a 3D shape model; and mapping the texture to the 3D shape model based on the obtained information regarding the texture.

The operations further include: obtaining joint information corresponding to the person object by inputting the information regarding the 3D shape model and the posture information of the person object to a fifth neural network model trained to obtain joint information, where the generating a 3D avatar includes generating the 3D avatar based on the 3D shape model to which the texture of the image is mapped and the joint information.

Other aspects, advantages and salient features of the present disclosure will become apparent to those skilled in the art from the following description which set forth various embodiments of the present disclosure with reference to the accompanying drawings.

BRIEF DESCRIPTION OF THE DRAWINGS

The above and other aspects, and advantages of certain embodiments of the disclosure will be more apparent from the following description taken in conjunction with the accompanying drawings, in which.

DETAILED DESCRIPTION

Figure 1:
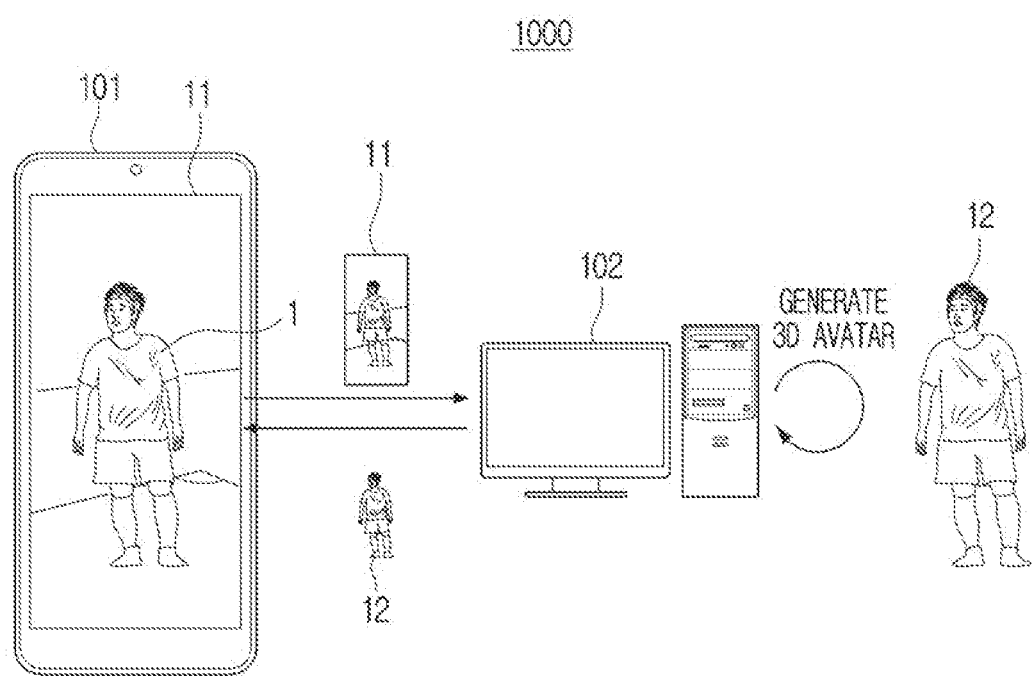
FIG. 1 is a diagram illustrating a 3D avatar generating system according to an embodiment.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding description portions of the disclosure. Therefore, the terms used in embodiments of the disclosure should be defined on the basis of the meanings of the terms and the contents throughout the disclosure rather than simple names of the terms.

The disclosure may be variously modified and have several embodiments, and specific embodiments of the disclosure are thus illustrated in the drawings and described in detail in the detailed description. However, it is to be understood that the disclosure is not limited to specific embodiments, but includes all modifications, equivalents, and substitutions without departing from the scope and spirit of the disclosure. In case that it is decided that the detailed description of the known art related to the disclosure may obscure the gist of the disclosure, a detailed description thereof will be omitted.

Terms 'first', 'second', and the like, may be used to describe various components, but the components are not to be construed as being limited by these terms. The terms are used only to distinguish one component from another component.

Singular forms used herein are intended to include plural forms unless explicitly indicated otherwise. It is to be understood that a term 'include' or 'formed of' used in the specification specifies the presence of features, numerals, steps, operations, components, parts or combinations thereof, which is mentioned in the specification, and does not preclude the presence or addition of one or more other features, numerals, steps, operations, components, parts or combinations thereof.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments provided in the present specification. In addition, in the drawings, portions unrelated to the description are omitted to clearly describe the disclosure, and similar portions are denoted by similar reference numerals throughout the specification.

FIG. 1 is a diagram illustrating a 3D avatar generating system according to an embodiment.

Referring to FIG. 1, a 3D avatar generating system 1000 may include a user terminal 101 and a server 102. The user terminal 101 may identify an image 11 including a person object 1 stored in the user terminal 101. For example, the user terminal 101 may identify the image 11 by searching an image including a person object from among a plurality of stored images. Alternatively, the user terminal 101 may identify the image 11 based on a user command for selecting a specific image.

The user terminal 101 may transmit the image 11 to the server 102. The server 102 may generate a 3D avatar 12 corresponding to the person object 1. For example, the server 102 may transmit information regarding the 3D avatar 12 to the user terminal 101. The user terminal 101 may render and output a 3D content based on the information regarding the 3D avatar 12.

As set forth above, related art avatar generating systems require a plurality of images which capture an environment at various angles in order to generate a 3D avatar. Various embodiments of the present disclosure provide systems and methods for generating a 3D avatar with only one image. For example, the 3D avatar generating system 1000 may generate the 3D avatar 12 with only image 11 stored in the user terminal 101. The 3D avatar generating system 1000 may advantageously generate the 3D avatar 12 more conveniently compared to the related avatar generating systems.

Figure 2:
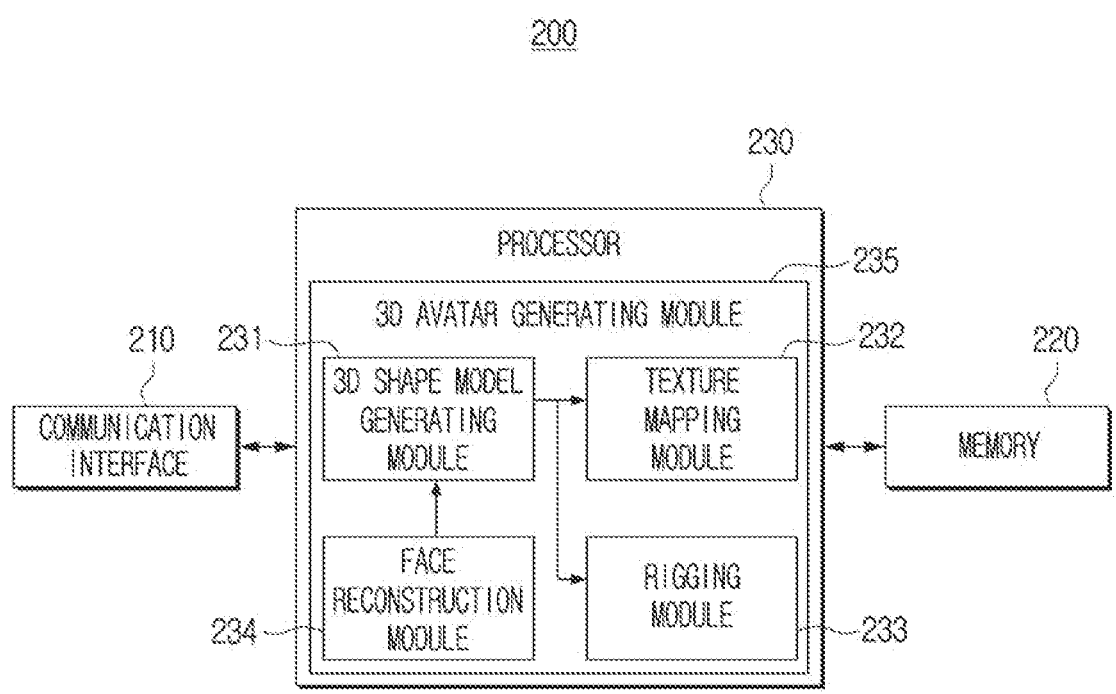
FIG. 2 is a block diagram illustrating configuration of an electronic apparatus according to a an embodiment.

FIG. 2 is a block diagram illustrating configuration of an electronic apparatus according to an embodiment.

Referring to FIG. 2, an electronic apparatus 200 may include a communication interface 210, a memory 220, and a processor 230. For example, the electronic apparatus 200 may be the server 102 of FIG. 1.

The communication interface 210 may include at least one communication circuitry, and may perform communication with various types of external devices or external servers. For example, the communication interface 210 may receive an image including a person object from an external apparatus. In addition, the communication interface 210 may transmit information regarding a 3D avatar generated based on the image to the external apparatus.

The communication interface 210 may include at least one of a WiFi communication module, a cellular communication module, a 3rd Generation (3G) mobile communication module, 4th Generation (4G) mobile communication module, a 4th Long Term Evolution (LTE) communication module, or 5th Generation (5G) mobile communication module.

The memory 220 may store an operating system (OS) for controlling the overall operations of the components of the electronic apparatus 200 and commands or data related to the components of the electronic apparatus 200. The memory 220 may store data necessary for generating a 3D avatar to perform various operations. The memory 220 may store a 3D shape model generating module 231, a texture mapping module 232, a rigging module 233, a face reconstruction module 234, and a 3D avatar generating module 235. In addition, the memory 220 may store a neural network model necessary for generating a 3D avatar. The memory 220 may be implemented as a non-volatile memory (e.g., hard disk, a solid state drive (SSD), a flash memory), a volatile memory, or the like.

The processor 230 may be electrically connected to the memory 220 to control the overall functions and operations of the electronic apparatus 200. When receiving an image including a person object through the communication interface 210, the processor 230 may load data necessary for the modules 231-235 stored in a non-volatile memory to perform various operations onto a volatile memory. Here, the loading refers to the operation of loading data stored in a non-volatile memory onto a volatile memory and storing the data so that the processor 230 can access it.

The 3D avatar generating module 235 is a module for generating a 3D avatar corresponding to a user object, and may include the 3D shape model generating module 231, the texture mapping module 232, the rigging module 233, and the face reconstruction module 234.

The 3D shape model generating module 231 may generate a 3D shape model corresponding to an object included in an image received through the communication interface 210. For example, the 3D shape model generating module 231 may generate a 3D shape model corresponding to a person object included in the image. The 3D shape model may mean an object or a polygon mesh in a 3D space.

The 3D shape model generating module 231 may generate a 3D shape model corresponding to a person object included in an image using a neural network model. For example, the 3D shape model generating module 231 may obtain information regarding an area in which a person object exists in an image by inputting the image to a first neural network model trained to identify an area corresponding to a predetermined object. In addition, the 3D shape model generating module 231 may obtain posture information of a person object by inputting the image to a second neural network model trained to estimate of a posture of an object. Further, the 3D shape model generating module 231 may obtain information regarding a 3D shape model by inputting information regarding an area in which a person object exists or posture information of a person object to a third neural network model trained to generate a 3D shape model.

The texture mapping module 232 may perform texture mapping regarding a 3D shape model. The texture mapping means an operation of drawing or coloring a detailed texture on the surface of a 3D shape model. The texture mapping module 232 may extract a texture of an image and project the extracted texture to the 3D shape model. For example, the texture mapping module 232 may obtain a first 3D shape model by projecting a texture of an image to a first area (e.g., a front area) of the 3D shape model.

The texture mapping module 232 may perform texture mapping based on identification information for each area of a 3D shape model. The texture mapping module 232 may obtain a second 3D shape model by mapping a texture of an image to a second area that is not the first area from among areas of the 3D shape model based on the identification information. Here, the identification information may include a label value corresponding to a specific body part. For example, when a texture is mapped to a head area corresponding to first identification information from among areas of the 3D shape model, the texture mapping module 232 may project a texture of the image (e.g., an image capturing the front of the user) to a first area (a face area) as it is. In addition, the texture mapping module 232 may project a texture of a specific area (e.g., a front head area) among textures of the image to a second area (a back head area).

In another example, when a texture is mapped to a body area corresponding to second identification information among areas of the 3D shape model, the texture mapping module 232 may project a texture of the image to the entire body area. The texture mapping module 232 may obtain identification information for each area of the 3D shape model by performing image segmentation with respect to the first 3D shape model.

The texture mapping module 232 may perform texture mapping using a neural network model. For example, the texture mapping module 232 may obtain information regarding a texture to be mapped to the 3D shape model by inputting the image, the information regarding the 3D shape model and the identification information to a fourth neural network model trained to obtain information regarding a texture corresponding to a 3D shape model. The information regarding a texture to be mapped to the 3D shape model may include information regarding a UV map. The texture mapping module 232 may perform texture mapping of the 3D shape model based on information regarding a texture obtained through the fourth neural network model.

The rigging module 233 may perform rigging for a 3D shape model based on the 3D shape model and posture information of a person object. The rigging module 233 may define a relationship between each joint constituting the 3D shape model and a surface of the 3D shape model. The rigging module 233 may obtain joint information of the 3D shape model and store the information in the memory 220. The joint information of the 3D shape model may include a parameter corresponding to each joint constituting the 3D shape model. The parameter corresponding to each joint may be related to a correlation between each joint and the surface of the 3D shape model. For example, a first parameter corresponding to a first joint may be related to information regarding how the surface of the first area of the 3D shape model is changed according to a movement of the first joint.

The rigging module 233 may obtain joint information of the 3D shape model using a neural network model. For example, the rigging module 233 may obtain joint information of a person object by inputting the information regarding the 3D shape model and the posture information of the person object to a fifth neural network trained to obtain joint information.

The face reconstruction module 234 may obtain a 3D face model based on a photographing image that captures the face of a person object. The face reconstruction module 234 may synthesize the 3D shape model generated by the 3D shape model generating module 231 with the 3D face model. For example, the face area of the 3D shape model may be replaced with the 3D face model. Accordingly, the quality of the face area of the 3D shape model can be improved. The texture mapping module 232 may perform texture mapping for a new 3D shape model in which the 3D shape model and the 3D face model are synthesized. In addition, the rigging module 233 may obtain joint information of the new 3D shape model.

When texture mapping and rigging is performed for the 3D shape model, a 3D avatar may be generated from the 3D shape model. The 3D avatar generating module 235 may store information regarding the generated 3D avatar in the memory 220. The 3D avatar generating module 235 may render a motion of the 3D avatar based on a pre-stored motion parameter.

A function related to artificial intelligence according to an embodiment is operated through the processor 230 and the memory 220. The processor 230 may include one or more processors. In this case, one or more processors may be a general-purpose processor such as a CPU, an AP, a Digital Signal Processor (DSP), etc., a graphics-only processor such as a GPU and a Vision Processing Unit (VPU), or an AI-only processor such as an NPU. The one or more processors may be configured to process input data according to a predefined operation rule or an artificial intelligence model. Alternatively, when one or more processors are AI-only processors, the AI-only processors may be designed with a hardware structure specialized for processing a specific artificial intelligence model.

The predefined operation rule or the artificial intelligence model is characterized by being created through learning. Here, being created through learning means creating a predefined operation rule or an artificial intelligence model, that is set to perform a desired characteristic (or purpose) as a basic artificial intelligence model, is trained by a learning algorithm using a plurality of learning data. The learning may be performed in a device itself in which AI according to an embodiment is performed, and/or may be implemented through a separate server/system. Examples of learning algorithms include, but are not limited to, supervised learning, unsupervised learning, semi-supervised learning, or reinforcement learning.

The AI model may be generated through learning. Generating the AI model through learning may refer to a basic AI model that is trained by using a plurality of learning data by a learning algorithm, so that a predefined operation rule or AI model of a desired characteristic (or purpose) is generated. The AI model may include a plurality of neural network layers. Each layer has a plurality of weight values, and performs a layer operation through a result of calculation of a previous layer and an operation of a plurality of weights. A plurality of weights of a plurality of neural network layers may be optimized by a learning result of the AI model. For example, a plurality of weights may be updated to reduce or minimize a loss value or cost value obtained in an AI model during a learning process.

The artificial intelligence model may be processed by an AI-only processor designed with a hardware structure specialized for processing a specific artificial intelligence model. The artificial intelligence model may be created through learning. Here, it is assumed that a basic artificial intelligence model is learned by using a plurality of learning data by a learning algorithm, thereby creating a predefined action rule or an artificial intelligence model configured to perform a desired characteristic (or purpose). The AI model may include a plurality of neural network layers. Each layer has a plurality of weight values, and performs a layer operation through calculation of a previous layer and an operation of a plurality of weights.

The artificial neural network may include a Deep Neural Network (DNN) and for example, may be a Convolutional Neural Network (CNN), a Deep Neural Network (DNN), a Recurrent Neural Network (RNN), a Generative Adversarial Network (GAN), a Restricted Boltzmann Machine (RBM), a Deep Belief Network (DBN), a Bidirectional Recurrent Deep Neural Network (BRDNN), a Deep Q-Networks, etc. However, the artificial neural network is not limited to the above-mentioned examples.

The electronic apparatus 100 may include an adaptive echo canceller (AEC) module for preprocessing a user voice, a noise suppression (NS) module, an end-point detection (EPD) module, or an automatic gain control (AGC) module. In addition, the electronic apparatus 100 may change an analog voice signal to a digital signal, or may include a digital signal processor (DSP) that changes a stored digital image or digital voice signal to an analog signal.

Figure 3:
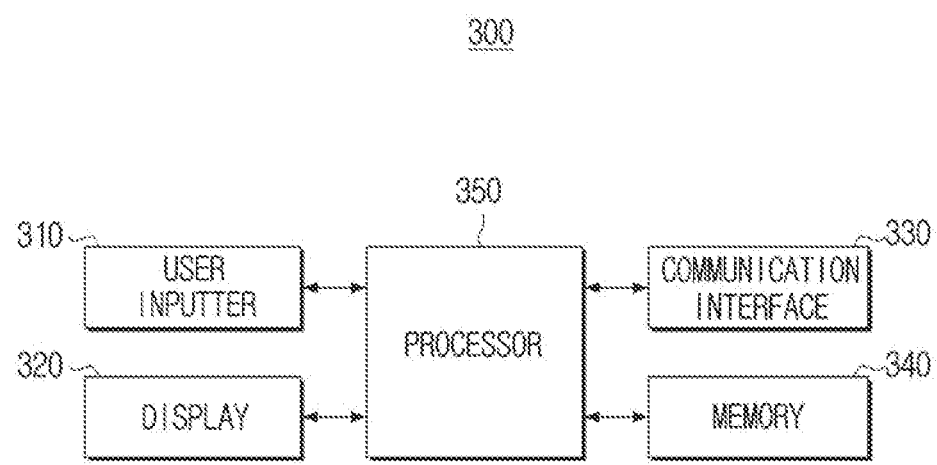
FIG. 3 is a block diagram illustrating configuration of another electronic apparatus according to a an embodiment.

FIG. 3 is a block diagram illustrating configuration of another electronic apparatus according to an embodiment.

Referring to FIG. 3, an electronic apparatus 300 may include a user inputter 310, a display 320, a communication interface 330, a memory 340, and a processor 350. For example, the electronic apparatus 300 may be the user terminal 101 of FIG. 1. The communication interface 330, the memory 340 and the processor 350 may correspond to the communication interface 210, the memory 220 and the processor 230 as described above with respect to FIG. 2, and overlapping description will be omitted.

The user inputter 310 is configured to receive a user command. For example, the processor 350 may receive a user command for selecting a specific image through the user inputter 310. The user inputter 310 may include one or more buttons, a keyboard, a mouse, etc., and may include a camera for receiving a user command in the form of a motion. When the display 320 is implemented as a touch pad or a touch panel, the display 320 may be considered to be included in the user inputter 310 in that it receives a user command in the form of a touch.

The display 320 is configured to display one or more images under the control of the processor 350. For example, the display 320 may display a rendered 3D content. The display 320 may be implemented as a Liquid Crystal Display Panel (LCD), an Organic Light Emitting Diodes (OLED), etc., or the display 320 may be implemented as a flexible display, a transparent display, etc. However, the display 320 according to an embodiment is not limited to a specific type of display.

The processor 350 may identify an image that can be restored to a 3D image from among a plurality of images stored in the memory 340. For example, the processor 350 may identify an image including a person object as an image that can be restored to a 3D image. The processor 350 may identify an image in which a face area of a person object is displayed from among images including a person object. Alternatively, the processor 350 may identify an image selected by a user. The processor 350 may control the communication interface 330 to transmit the identified image to an external apparatus.

The processor 350 may render a generated 3D avatar. In addition, the processor 350 may control the display 320 to display the rendered 3D avatar.

Figure 4:
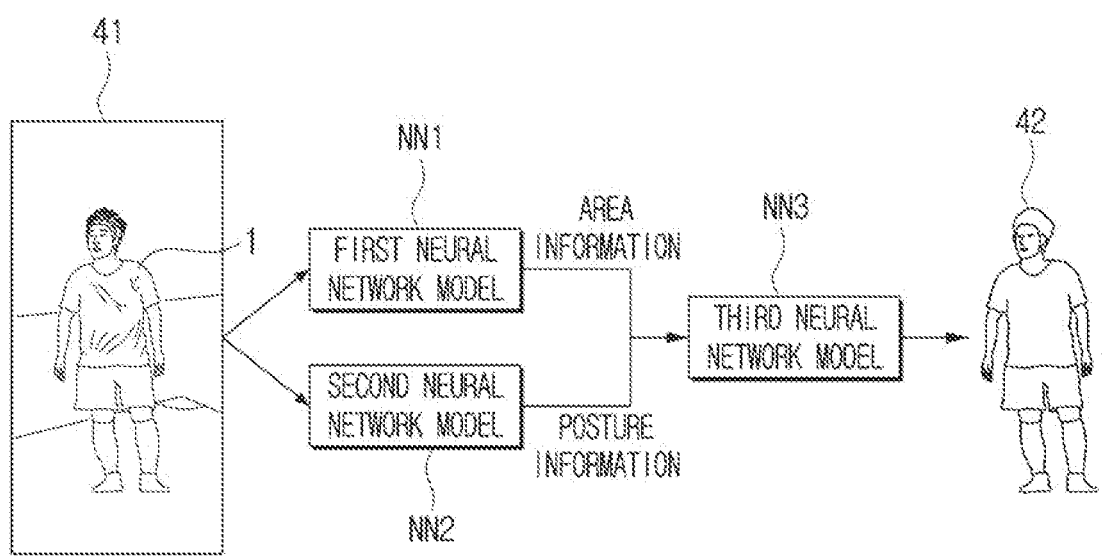
FIG. 4 is a diagram illustrating a method for obtaining a 3D shape model according to an embodiment.

FIG. 4 is a diagram illustrating a method for obtaining a 3D shape model according to an embodiment.

Referring to FIG. 4, the electronic apparatus 200 may obtain an image 41 including a person object 1. The electronic apparatus 200 may obtain information regarding an area corresponding to the person object 1 by inputting the image 41 to a first neural network model (NN1). The first neural network model (NN1) may be a neural network model trained to extract an area corresponding to an object. The electronic apparatus 200 may obtain posture information of the person object 1 by inputting the image 41 to a second neural network model (NN2). The second neural network model (NN2) may be a neural network model trained to estimate a posture of an object. The electronic apparatus 200 may obtain information regarding a 3D shape model 42 corresponding to the person object 1 by inputting the information regarding an area corresponding to the person object 1 and the posture information of the person object 1 to a third neural network model (NN3). The third neural network model (NN3) may be a neural network model trained to generate a 3D shape model.

The first neural network model (NN1), the second neural network model (NN2) and the third neural network model (NN3) may be integrated into one neural network model. In this case, the electronic apparatus 200 may obtain information regarding the 3D shape model by inputting the image 41 to the integrated neural network model.

Figure 5:
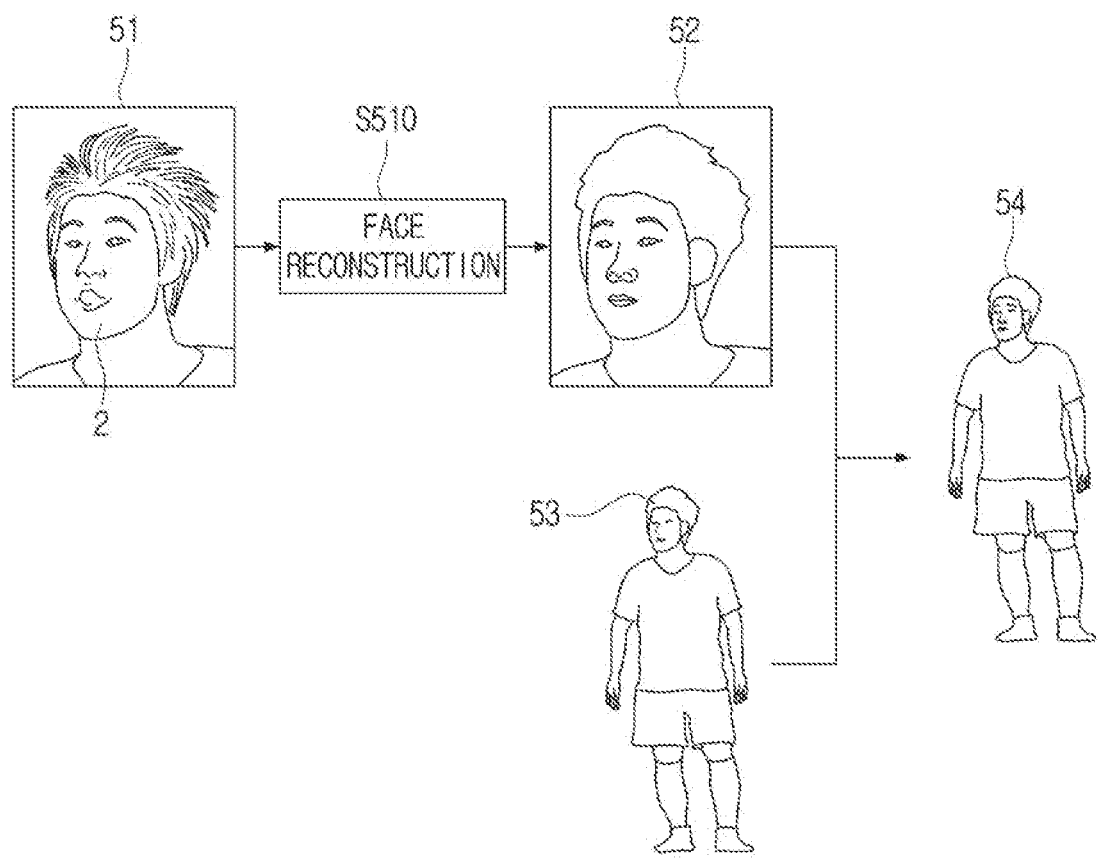
FIG. 5 is a diagram illustrating another method for obtaining a 3D shape model according to an embodiment.

FIG. 5 is a diagram illustrating another method for obtaining a 3D shape model according to an embodiment.

Referring to FIG. 5, the electronic apparatus 200 may obtain a photographic image 51 capturing a face 2 of a person object. The photographic image 51 may be stored in a user terminal. The electronic apparatus 200 may obtain a 3D face model 52 corresponding to the face 2 by reconstructing the face 2 of the person object (S510). For example, the electronic apparatus 200 may obtain the 3D face model 52 by inputting the photographic image 51 to a sixth neural network model trained to reconstruct a face. The electronic apparatus 200 may obtain a new 3D shape model 54 in which the quality of the face area is improved by synthesizing the 3D face model 52 and a 3D shape model 53 corresponding to the person object.

Figure 6:
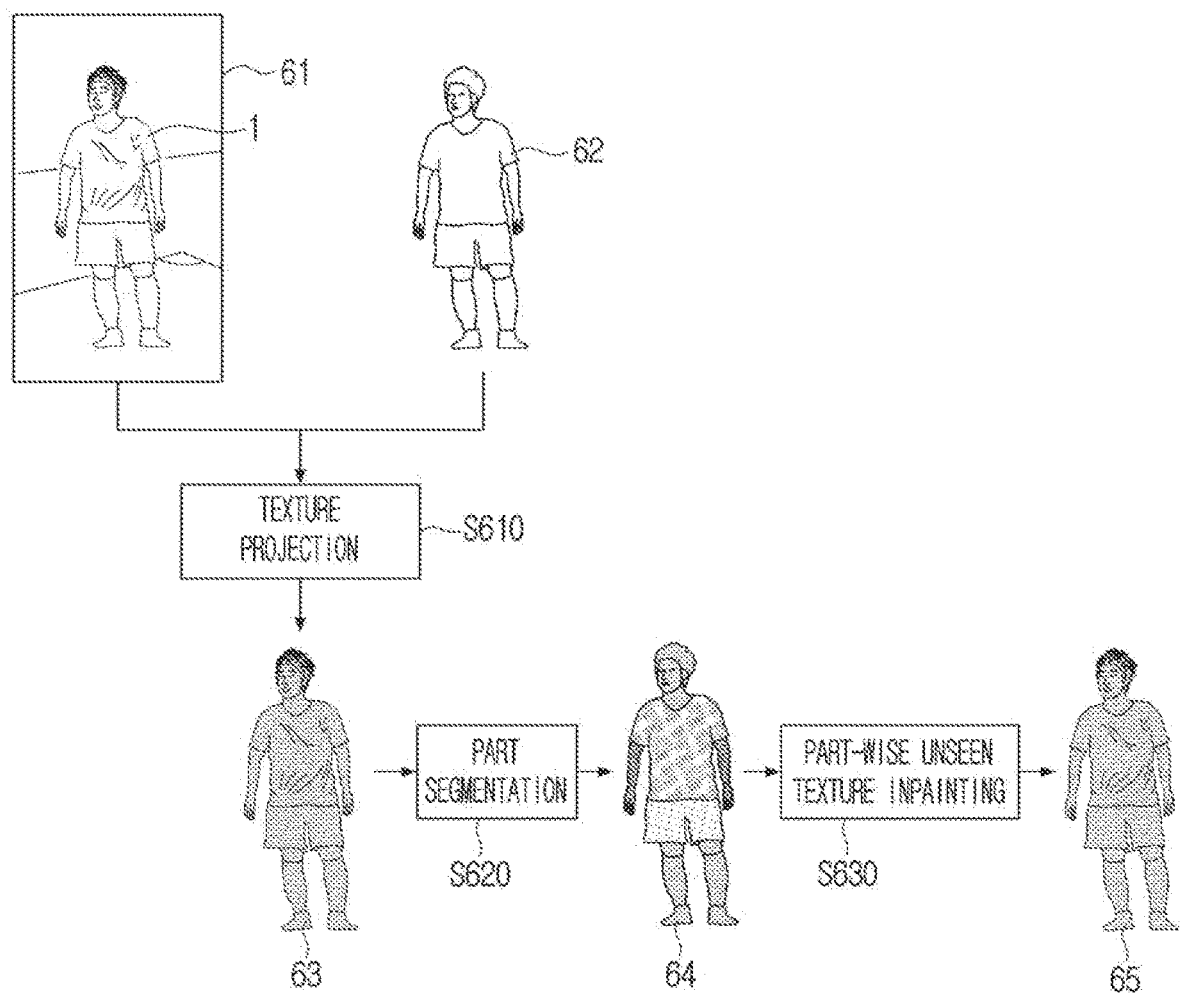
FIG. 6 is a diagram illustrating a texture mapping method according to an embodiment.

FIG. 6 is a diagram illustrating a texture mapping method according to an embodiment.

Referring to FIG. 6, the electronic apparatus 200 may project a texture of an image 61 including the person object 1 to a first 3D shape model 62 corresponding to the person object 1 (S610). Accordingly, the electronic apparatus 200 may obtain a second 3D shape model 63 in which the texture is projected to the first area.

By performing segmentation for a second 3D shape model 63, the electronic apparatus 200 may obtain identification information 64 for each area of the second 3D shape model 63 (S620). For example, the electronic apparatus 200 may obtain identification information for each of the head part, the arm part and the leg part of the second 3D shape model 63.

The electronic apparatus 200 may perform texture inpainting for the second 3D shape model 63 based on the identification information 64 for each area of the second 3D shape model 63 (S630). Accordingly, the electronic apparatus 200 may obtain a third 3D shape model 65 in which the texture is projected to the entire area of the second 3D shape model 63.

For example, with respect to the arm part of the second 3D shape model 63, the electronic apparatus 200 may project the texture of the first area (e.g., the front area) to the second area (e.g., the rear area) as it is. In another example, with respect to the head part of the second 3D shape model 63, the electronic apparatus 200 may not project the texture of the first area to the second area as it is. In this case, the electronic apparatus 200 may project the texture of a specific area of the head part (e.g., the hair part) to the second area (i.e., the back of the head). As such, the electronic apparatus 200 may produce a more natural texture by performing texture mapping in consideration of the characteristics of each part of the 3D shape model.

Figure 7:
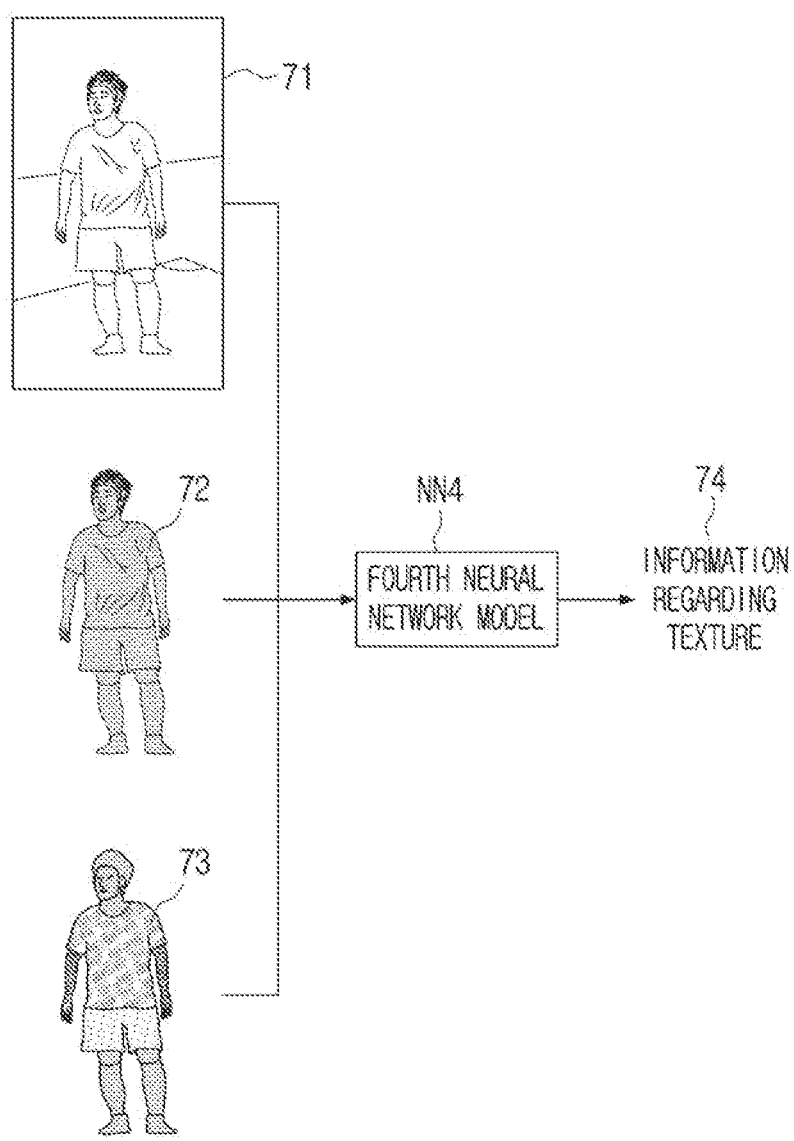
FIG. 7 is a diagram illustrating another texture mapping method according to an embodiment.

FIG. 7 is a diagram illustrating another texture mapping method according to an embodiment.

Referring to FIG. 7, the electronic apparatus 200 may obtain information 74 regarding a texture to be projected on a 3D shape model 72 by inputting an image 71 including the person object 1, the 3D shape model 72 corresponding to the person object 1 and identification information 73 for each area of the 3D shape model 72 to the fourth neural network model (NN4). The electronic apparatus 200 may perform texture mapping for the 3D shape model 72 based on the obtained information 74 regarding the texture. The fourth neural network model (NN4) may be a neural network model trained to obtain information regarding a texture corresponding to a 3D shape model.

Figure 8:
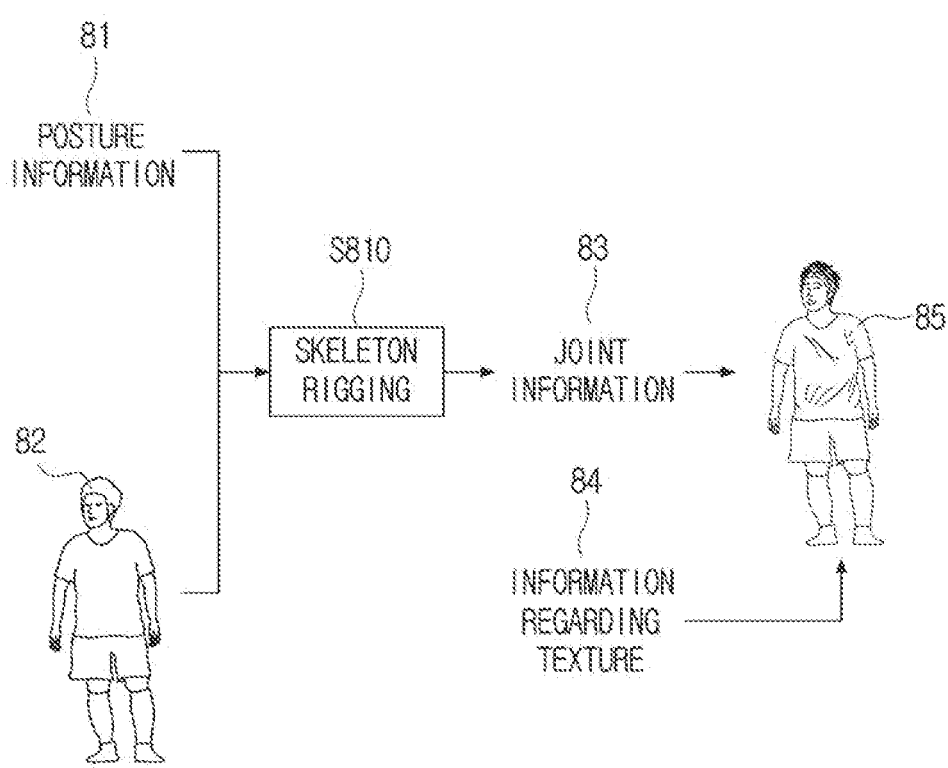
FIG. 8 is a diagram illustrating a rigging method according to an embodiment.

FIG. 8 is a diagram illustrating a rigging method according to an embodiment.

Referring to FIG. 8, the electronic apparatus 200 may perform rigging for a 3D shape model 82 based on posture information 81 of a person object and the 3D shape model 82 corresponding to the person object (S810). For example, the electronic apparatus 200 may define a relationship between each joint constituting the 3D shape model 82 and a surface of the 3D shape model 82. The electronic apparatus 200 may perform rigging and obtain joint information 83 of the 3D shape model 82. The joint information 83 may include a parameter corresponding to each joint constituting the 3D shape model 82. The parameter corresponding to each joint may be related to a correlation between each joint and a surface of the 3D shape model 82.

The electronic apparatus 200 may generate a 3D avatar 85 corresponding to a person object based on the joint information 83 and information 84 regarding a texture. In other words, the electronic apparatus 200 may generate the 3D avatar 85 by performing rigging and texture mapping for the 3D shape model 82.

Figure 9:
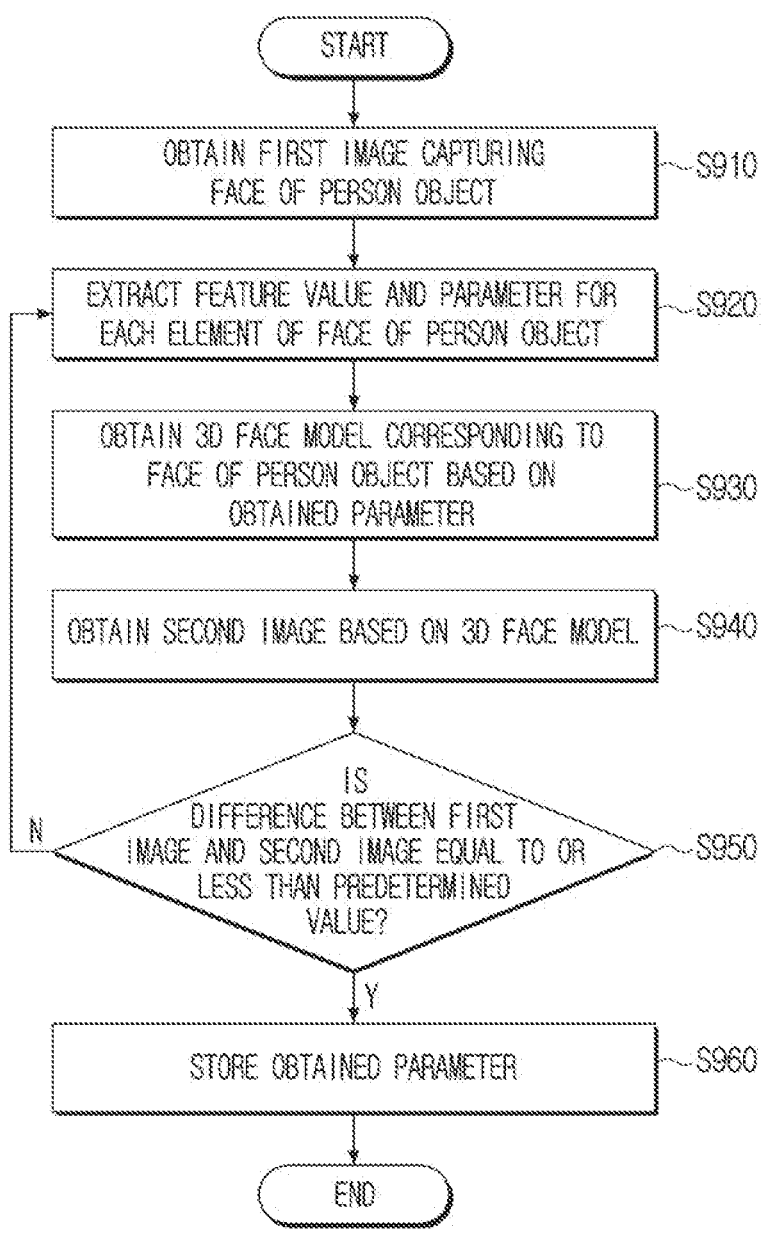
FIG. 9 is a flowchart illustrating a method of controlling an electronic apparatus according to an embodiment.

FIG. 9 is a flowchart illustrating a method of controlling an electronic apparatus according to an embodiment.

Referring to FIG. 9, the electronic apparatus 200 may obtain a first image capturing a face of a person object (S910).

The electronic apparatus 200 may extract a feature value and a parameter for each element of the face of the person object. For example, the electronic apparatus 200 may obtain a feature value regarding each element such as the eye, nose and mouth of the person object. In addition, the electronic apparatus 200 may extract a parameter for each element of the face of the person object based on the obtained feature value. The electronic apparatus 200 may obtain a feature value and a parameter using a neural network model.

The electronic apparatus 200 may obtain a 3D face model corresponding to the face of the person object based on the obtained parameter (S930). For example, the electronic apparatus 200 may obtain a 3D face model by inputting the parameter to a pre-stored 3D face generating program. The electronic apparatus 200 may obtain a second image based on the 3D face model (S940). The electronic apparatus 200 may obtain the second image by performing 2D rendering for the 3D face model. The electronic apparatus 200 may determine whether the difference between the first image and the second image is equal to or less than a predetermined value (S950). For example, the electronic apparatus 200 may compare the pixel values of the first image and the second image and calculate the difference between the first image and the second image.

When the difference between the first image and the second image is equal to or less than a predetermined value (S950-Y), the electronic apparatus 200 may store the obtained parameter (S960). In addition, the electronic apparatus 200 may generate the 3D face model by inputting the parameter to the pre-stored 3D face generating program. The electronic apparatus 200 may improve the quality of the face area of the 3D shape model by synthesizing the 3D face model with the 3D shape model corresponding to the person object. When the difference between the first image and the second image is less than the predetermined value (S950-N), the electronic apparatus 200 may newly extract a feature value and a parameter for each element of the face of the person object (S920).

Figure 10:
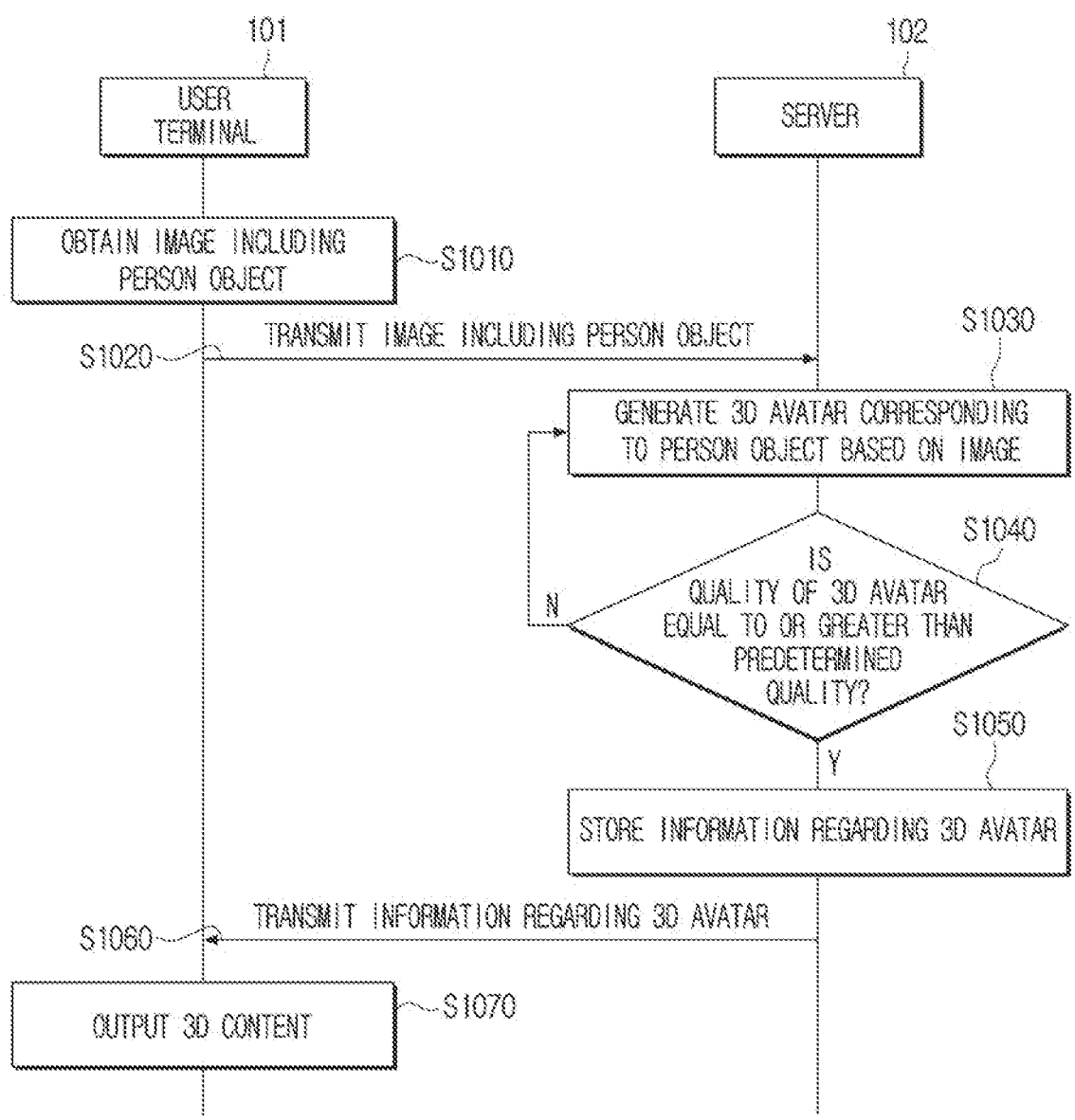
FIG. 10 is a sequence diagram illustrating a 3D avatar generating system according to an embodiment.

FIG. 10 is a sequence diagram illustrating a 3D avatar generating system according to an embodiment.

Referring to FIG. 10, a 3D avatar generating system 1000 may include the user terminal 101 and the server 102. The user terminal 101 may obtain an image including a person object (S1010). For example, the user terminal 101 may identify an image including a person object from among images stored in the user terminal 101. Alternatively, the user terminal 101 may identify an image based on a user command for selecting a specific image.

The user terminal 101 may transmit the image including the person object to the server 102 (S1020). The server 102 may generate a 3D avatar corresponding to the person object based on the image (S1030). The method of generating a 3D avatar has been described above with reference to FIGS. 2 to 8, so detailed description thereof will be omitted.

The server 102 may determine whether the quality of the 3D avatar is equal to or greater than a predetermined quality (S1040). When the quality of the 3D avatar is equal to or greater than the predetermined quality (S1040-Y), the server 102 may store information regarding the 3D avatar (S1050). In addition, the server 102 may transmit the information regarding the 3D avatar to the user terminal 101 (S1060). The user terminal 101 may render and output a 3D content based on the information regarding the 3D avatar (S1070). When the quality of the 3D avatar is lower than the predetermined quality (S1040-N), the server 102 may generate a new 3D avatar corresponding to the person object again (S1030).

Figure 11:
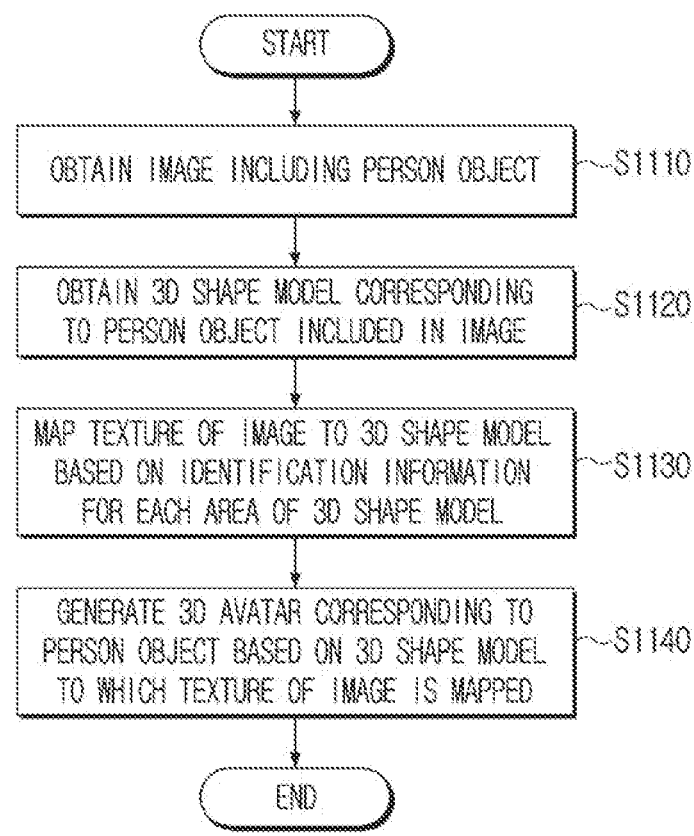
FIG. 11 is a flowchart illustrating another method of controlling an electronic apparatus according to an embodiment.

FIG. 11 is a flowchart illustrating another method of controlling an electronic apparatus according to an embodiment.

Referring to FIG. 11, the electronic apparatus 200 may obtain an image including a person object (S1110). The electronic apparatus 200 may obtain a 3D shape model corresponding to the person object included in the image (S1120). The electronic apparatus 200 may obtain information regarding an area in which the person object exists in the image by inputting the image to the first neural network model trained to identify an area corresponding to a predetermined object. The electronic apparatus 200 may obtain posture information of the person object by inputting the image to the second neural network model trained to estimate the posture of the object. The electronic apparatus 200 may obtain information regarding a 3D shape model by inputting the information regarding the area in which the person object exists in the image and the posture information of the person object to the third neural network model trained to generate a 3D shape model.

The electronic apparatus 200 may obtain a photographic image capturing the face of the person object. The electronic apparatus 200 may obtain a 3D face model of the person object by inputting the photographic image to the sixth neural network model trained to reconstruct a face. The electronic apparatus 200 may synthesize the 3D shape model with the 3D face model. Accordingly, a 3D shape model in which the quality of the face area is improved can be obtained.

The electronic apparatus 200 may map a texture of the image to the 3D shape model based on identification information for each area of the 3D shape model (S1130). The electronic apparatus 200 may obtain a first 3D shape model by mapping the texture of the image to the first area of the 3D shape model. The electronic apparatus 200 may obtain a second 3D shape model by mapping the texture of the image to the second area which is not the first area from among areas of the 3D shape model based on the identification information. The electronic apparatus 200 may obtain identification information for each area of the 3D shape model by performing image segmentation for the first 3D shape model.

The electronic apparatus 200 may obtain information regarding a texture to be mapped to the 3D shape model by inputting the image, the information regarding the 3D shape model and the identification information to the fourth neural network model trained to obtain information regarding a texture corresponding to the 3D shape model. The electronic apparatus 200 may perform texture mapping for the 3D shape model based on the obtained information regarding the texture.

The electronic apparatus 200 may generate a 3D avatar corresponding to the person object based on the 3D shape model to which the texture of the image is mapped (S1140).

The electronic apparatus 200 may obtain joint information corresponding to the person object by inputting the information regarding the 3D shape model and the posture information of the person object to the fifth neural network model trained to obtain joint information. The electronic apparatus 200 may generate a 3D avatar based on the 3D shape model to which the texture of the image is mapped and the joint information.

The above-described various embodiments may be implemented in a recording medium that can be read by a computer or a similar device using software, hardware, or a combination of software and hardware. In some cases, the embodiments described in the disclosure may be implemented by the processor itself. When implemented as software, the embodiments such as procedures and functions described in the specification may be implemented by separate software modules. Each of the software modules may perform one or more functions and operations described in the specification.

The computer instructions for performing processing operations according to the exemplary embodiments of the disclosure described above may be stored in a non-transitory computer-readable medium. The computer instructions stored in the non-transitory computer-readable medium cause a specific device to perform the processing operations according to the diverse embodiments described above when they are executed by a processor of the specific device.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

The machine-readable storage medium may be provided in the form of non-transitory storage medium. Here, the term 'non-transitory storage medium' means that it does not contain a signal and is tangible, but does not distinguish between semi-permanent or temporary storage of data in the storage medium. For example, the 'non-transitory storage medium' may include a buffer in which the data is temporarily stored.

According to an embodiment, the methods according to the various embodiments in the disclosure may be included and provided in a computer program product. The computer program product may be traded as a product between a seller and a purchaser. The computer program product may be distributed in a form of the machine-readable storage medium (for example, a compact disc read only memory (CD-ROM)) that may be read by the machine, or distributed online (e.g. download or upload) through an application store (for example, PlayStore™) or directly between two user devices (e.g., smartphones). In the case of the online distribution, at least portions of the computer program products (e.g., downloadable app) may be at least temporarily stored or generated in the machine-readable storage medium such as a memory of a server of a manufacturer, a server of an application store or a relay server.

While example embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims and their equivalents, and such modifications are not to be interpreted independently from the technical idea or prospect of the disclosure.

What is claimed is:

1. An electronic apparatus comprising:
a communication interface including communication circuitry;
a memory storing at least one instruction; and
a processor configured to execute the at least one instruction to:
obtain an image including a person object;
obtain a face image including a face of the person object;
obtain a 3D face model of the person object based on the face image;
obtain a three-dimensional (3D) shape model corresponding to the person object included in the image by mapping a texture of the image to a first area of the 3D shape model to generate a first 3D shape model and mapping the texture of the image to a second area of the 3D shape model based on identification information, the second area being different than the first area to generate a second 3D shape model; and
generate a 3D avatar corresponding to the person object based on the 3D shape model to which the texture of the image is mapped.

2. The electronic apparatus of claim 1, wherein the processor is further configured to execute the at least one instruction to obtain the identification information for each area of the 3D shape model by performing image segmentation with respect to the first 3D shape model.

3. The electronic apparatus of claim 1, wherein the processor is further configured to execute the at least one instruction to:
obtain information regarding an area in which the person object is present in the image by inputting the image to a first neural network model trained to identify an area corresponding to a predetermined object;
obtain posture information of the person object by inputting the image to a second neural network model trained to estimate a posture of an object; and
obtain information regarding the 3D shape model by inputting the information regarding an area in which the person object is present in the image and the posture information of the person object to a third neural network model trained to generate a 3D shape model.

4. The electronic apparatus of claim 1, wherein the processor is further configured to execute the at least one instruction to:
obtain information regarding the texture to be mapped to the 3D shape model by inputting the image, information regarding the 3D shape model and the identification information to a fourth neural network model trained to obtain information regarding a texture corresponding to a 3D shape model; and
map the texture to the 3D shape model based on the obtained information regarding the texture.

5. The electronic apparatus of claim 1, wherein the processor is further configured to execute the at least one instruction to:
obtain joint information corresponding to the person object by inputting information regarding the 3D shape model and posture information of the person object to a fifth neural network model trained to obtain joint information; and
generate the 3D avatar based on the 3D shape model to which the texture of the image is mapped and the joint information.

6. The electronic apparatus of claim 1, wherein the processor is configured to execute the at least one instruction to:
obtain a photographic image as the face image;
obtain the 3D face model of the person object by inputting the photographic image to a sixth neural network model trained to reconstruct a face; and
synthesize the 3D shape model and the 3D face model.

7. The electronic apparatus of claim 1, wherein the processor is further configured to execute the at least one instruction to, based on a quality of the 3D avatar being equal to or greater than a predetermined quality, control the communication interface to transmit information regarding the 3D avatar to an external apparatus.

8. A method for obtaining a three-dimensional (3D) avatar, the method comprising:
obtaining an image including a person object;
obtaining a face image capturing a face of the person object;
obtaining a 3D face model of the person object based on the face image
obtaining a 3D shape model corresponding to the person object included in the image by mapping a texture of the image to a first area of the 3D shape model to generate a first 3D shape model and mapping the texture of the image to a second area of the 3D shape model based on identification information, the second area being different than the first area to generate a second 3D shape model; and
generating a 3D avatar corresponding to the person object based on the 3D shape model to which the texture of the image is mapped.

9. The method of claim 8, further comprising:
obtaining identification information for each area of the 3D shape model by performing image segmentation with respect to the first 3D shape model.

10. The method of claim 8, wherein the obtaining the 3D shape model comprises:
obtaining information regarding an area in which the person object is present in the image by inputting the image to a first neural network model trained to identify an area corresponding to a predetermined object;
obtaining posture information of the person object by inputting the image to a second neural network model trained to estimate a posture of an object; and
obtaining information regarding the 3D shape model by inputting the information regarding an area in which the person object is present in the image and the posture information of the person object to a third neural network model trained to generate a 3D shape model.

11. The method of claim 8, wherein the mapping the texture of the image to the 3D shape model comprises:
obtaining information regarding the texture to be mapped to the 3D shape model by inputting the image, information regarding the 3D shape model and the identification information to a fourth neural network model trained to obtain information regarding a texture corresponding to a 3D shape model; and
mapping the texture to the 3D shape model based on the obtained information regarding the texture.

12. The method of claim 8, further comprising:
obtaining joint information corresponding to the person object by inputting information regarding the 3D shape model and posture information of the person object to a fifth neural network model trained to obtain joint information, wherein the generating a 3D avatar comprises generating the 3D avatar based on the 3D shape model to which the texture of the image is mapped and the joint information.

13. The method of claim 8, further comprising:
obtaining a photographic image as the face image; and
obtaining the 3D face model of the person object by inputting the photographic image to a sixth neural network model trained to reconstruct a face,
wherein the obtaining the 3D shape model comprises synthesizing the 3D shape model and the 3D face model.

14. A non-transitory computer readable medium for storing computer readable program code or instructions for carrying out operations, when executed by a processor, for obtaining a three-dimensional (3D) avatar, the operations comprising:
obtaining an image including a person object;
obtaining a face image capturing a face of the person object;
obtaining a 3D face model of the person object based on the face image;
obtaining a 3D shape model corresponding to the person object included in the image by mapping a texture of the image to a first area of the 3D shape model to generate a first 3D shape model and mapping the texture of the image to a second area of the 3D shape model based on identification information, the second area being different than the first area to generate a second 3D shape model; and
generating a 3D avatar corresponding to the person object based on the 3D shape model to which the texture of the image is mapped.

15. The non-transitory computer readable medium of claim 14, wherein the obtaining the 3D shape model comprises:
obtaining information regarding an area in which the person object is present in the image by inputting the image to a first neural network model trained to identify an area corresponding to a predetermined object;
obtaining posture information of the person object by inputting the image to a second neural network model trained to estimate a posture of an object; and
obtaining information regarding the 3D shape model by inputting the information regarding an area in which the person object is present in the image and the posture information of the person object to a third neural network model trained to generate a 3D shape model.

16. The non-transitory computer readable medium of claim 14, wherein the mapping the texture of the image to the 3D shape model comprises:
obtaining information regarding the texture to be mapped to the 3D shape model by inputting the image, information regarding the 3D shape model and the identification information to a fourth neural network model trained to obtain information regarding a texture corresponding to a 3D shape model; and
mapping the texture to the 3D shape model based on the obtained information regarding the texture.

17. The non-transitory computer readable medium of claim 14, further comprising:
obtaining joint information corresponding to the person object by inputting information regarding the 3D shape model and posture information of the person object to a fifth neural network model trained to obtain joint information,
wherein the generating a 3D avatar comprises generating the 3D avatar based on the 3D shape model to which the texture of the image is mapped and the joint information.

* * * * *